United States Patent
Ko et al.

(10) Patent No.: US 9,823,699 B2
(45) Date of Patent: Nov. 21, 2017

(54) FLEXIBLE DEVICE AND FOLDING UNIT THEREOF

(71) Applicant: Samsung Electronics Co., Ltd., Suwon-si, Gyeonggi-do (KR)

(72) Inventors: Jae-Hun Ko, Seoul (KR); Ji-Seon Kim, Seoul (KR); Jung-Hyun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/741,688

(22) Filed: Jun. 17, 2015

(65) Prior Publication Data

US 2015/0370287 A1 Dec. 24, 2015

(30) Foreign Application Priority Data

Jun. 24, 2014 (KR) ........................ 10-2014-0076939

(51) Int. Cl.
*G06F 1/16* (2006.01)
*H04M 1/02* (2006.01)

(52) U.S. Cl.
CPC .......... *G06F 1/1652* (2013.01); *G06F 1/1626* (2013.01); *G06F 1/1679* (2013.01); *G06F 1/1681* (2013.01); *H04M 1/0268* (2013.01); *G06F 2200/1633* (2013.01); *H04M 1/0216* (2013.01)

(58) Field of Classification Search
CPC .... G06F 1/1652; G06F 1/1681; G06F 1/1679; G06F 1/1626; G06F 2200/1633; G06F 1/1601; H04M 1/0216; H04M 1/0268; H05K 5/0226; E05D 7/00
USPC ............ 361/679.01, 679.02, 679.04–679.09, 361/679.21–679.3, 679.55–679.58; 455/575.1–575.4
See application file for complete search history.

(56) References Cited

U.S. PATENT DOCUMENTS

| 5,209,448 A | 5/1993 | Hatanaka et al. |
| 8,817,467 B2* | 8/2014 | Ore Yang ............... G06F 1/1628 361/679.55 |
| 9,176,535 B2* | 11/2015 | Bohn ................... G06F 1/1641 |

(Continued)

FOREIGN PATENT DOCUMENTS

| CN | 103228114 A | 7/2013 |
| EP | 1 635 313 A2 | 3/2006 |

(Continued)

OTHER PUBLICATIONS

Anonymous, Axminster Large Flexible Curve, Axminster Tools & Machinery, Dec. 17, 2013, XP055251500, www.axminster.co.uk/axminster-large-flexible-curve.

*Primary Examiner* — Steven T Sawyer
*Assistant Examiner* — Sagar Shrestha
(74) *Attorney, Agent, or Firm* — Jefferson IP Law, LLP

(57) ABSTRACT

A flexible device in which a display is folded is provided. The flexible device includes a main body, a flexible display fixed to a first surface of the main body, and a cover coupled to the main body to face a second surface of the main body, wherein the second surface of the main body is opposite to the first surface of the main body, such that when the main body is curved or folded, the cover moves with respect to the second surface of the main body to compensate for a difference in elongation, which is generated when the main body is curved or folded.

8 Claims, 20 Drawing Sheets

(56) References Cited

U.S. PATENT DOCUMENTS

| | | | |
|---|---|---|---|
| 2004/0266502 A1 | 12/2004 | Holtorf et al. | |
| 2006/0050169 A1* | 3/2006 | Misawa | G06F 1/1616 348/333.06 |
| 2007/0097014 A1 | 5/2007 | Solomon et al. | |
| 2008/0018631 A1* | 1/2008 | Hioki | G02F 1/133305 345/206 |
| 2011/0132802 A1* | 6/2011 | Kim | A45C 11/00 206/701 |
| 2011/0286157 A1* | 11/2011 | Ma | G06F 1/1652 361/679.01 |
| 2012/0243207 A1* | 9/2012 | Wang | G09F 9/301 362/97.1 |
| 2012/0307472 A1 | 12/2012 | Bohn et al. | |
| 2012/0314399 A1* | 12/2012 | Bohn | G06F 1/1616 362/97.1 |
| 2013/0010405 A1* | 1/2013 | Rothkopf | H04M 1/0216 361/679.01 |
| 2013/0314611 A1 | 11/2013 | Okutsu et al. | |
| 2013/0321987 A1* | 12/2013 | Ore Yang | G06F 1/1628 361/679.01 |
| 2014/0029171 A1 | 1/2014 | Lee | |
| 2014/0042293 A1* | 2/2014 | Mok | G06F 1/1652 248/682 |
| 2014/0126133 A1* | 5/2014 | Griffin | G06F 1/1652 361/679.27 |
| 2014/0355195 A1* | 12/2014 | Kee | G06F 1/1616 361/679.27 |
| 2015/0022436 A1* | 1/2015 | Cho | G06F 1/1652 345/156 |
| 2015/0077917 A1* | 3/2015 | Song | G06F 1/1681 361/679.27 |
| 2015/0361696 A1* | 12/2015 | Tazbaz | H04M 1/022 361/679.27 |

FOREIGN PATENT DOCUMENTS

| | | | | |
|---|---|---|---|---|
| EP | 2 595 029 A1 | 5/2013 | | |
| EP | 2 765 479 A2 | 8/2014 | | |
| KR | 10-0867608 B1 | 11/2008 | | |
| KR | 20110141119 | * | 7/2013 | ........... G06F 1/1652 |
| KR | 20130073331 | * | 7/2013 | ........... G06F 1/1652 |
| WO | 2009/064965 A2 | 5/2009 | | |

* cited by examiner

FLEXIBLE DEVICE AND FOLDING UNIT THEREOF

CROSS-REFERENCE TO RELATED APPLICATION(S)

This application claims the benefit under 35 U.S.C. §119(a) of a Korean patent application filed on Jun. 24, 2014 in the Korean Intellectual Property Office and assigned Serial number 10-2014-0076939, the entire disclosure of which is hereby incorporated by reference.

TECHNICAL FIELD

The present disclosure relates to a flexible device which may be curved or folded, and a folding unit thereof.

BACKGROUND

An ordinary portable device may refer to an electronic device or a communication device which allows a user to enjoy not only a communication function, such as a voice communication or a message transmission, but also multimedia services such as storing various information items, playing a game, and watching a video while the user carries the device. The portable device may include, for example, a smart phone, a tablet Personal Computer (PC), a palm PC, a portable game machine, a video/music file reproducer, a cellular phone, or a notebook PC.

Presently, with only one portable device, it becomes possible to execute not only a communication function such as voice communication, but also a banking function, such as a micropayment, and various other functions or services, such as game/multimedia services. Originally, portable devices merely provided a voice communication service or a message transmission service. However, with the development of electronic/communication techniques, portable devices have been gradually miniaturized, slimmed, and lightened. As such, not only have the communication functions been incorporated into the portable devices, but also, for example, a security function enabling banking transactions, a multimedia function for enjoying a game or a video image, and a simple business transaction function including the transmission/reception of Internet information and/or mail have been incorporated into the portable devices.

Accordingly, displays mounted on the portable devices have also been improved, and various display devices have been developed. As the display devices, for example, a Liquid Crystal Display (LCD) device, a Plasma Display Panel (PDP) device, a Field Emission Display (FED) device, an Electro Luminescence Display (ELD) device, and an Organic ELD (OELD) have been developed, and display devices are still developed in a direction of pursuing thinning, lightening, and low power consumption.

In addition, flexible or foldable display devices have been developed, and curved-type display devices are also increasingly being employed in Televisions (TVs), monitors and wearable devices.

The above information is presented as background information only to assist with an understanding of the present disclosure. No determination has been made, and no assertion is made, as to whether any of the above might be applicable as prior art with regard to the present disclosure.

However, a flexible device employing a flexible display device is limited in bent angle or folded angle due to a difference in elongation generated when it is curved, bent or folded. If a structure capable of removing the above-mentioned difference in elongation appears, flexible devices may become more prolific.

SUMMARY

Aspects of the present disclosure are to address at least the above-mentioned problems and/or disadvantages and to provide at least the advantages described below. Accordingly, an aspect of the present disclosure is to provide a flexible device including a main body, a flexible display fixed to one surface of the main body, and a cover coupled to the main body to face the other surface of the main body, so that when the main body is curved or folded, the cover is moved to compensate for a difference in elongation which is generated when the main body is curved or folded, and a folding unit of the flexible device.

Another aspect of the present disclosure is to provide a flexible device in which a folding unit having a simple structure is disposed so as to make an external appearance of a folded portion beautiful, and the folding unit of the flexible device Another aspect of the present disclosure is to provide a flexible device in which a thickness of a folded portion is minimized (slimmed), and a folding unit of the flexible device.

Another aspect of the present disclosure is to provide a flexible device, of which the curved or folded degree may be adjusted, and a folding unit of the flexible device.

In accordance with an aspect of the present disclosure, a flexible device is provided. The flexible device includes a main body, a flexible display fixed to a first surface of the main body, and a cover coupled to the main body to face a second surface of the main body, wherein the second surface of the main body is opposite to the first surface of the main body, such that when the main body is curved or folded, the cover moves with respect to the second surface of the main body to compensate for a difference in elongation, which is generated when the main body is curved or folded.

In accordance with another aspect of the present disclosure, a flexible device is provided. The flexible device includes a main body, a flexible display fixed to one surface of the main body, a folding unit disposed on the main body, and a holding unit mounted in the main body and configured to cooperate with the folding unit to hold a curved or folded state of the main body.

In accordance with another aspect of the present disclosure, a folding unit is provided. The folding unit includes first portions that guide a sliding movement in a direction perpendicular to a folded direction, second portions disposed between the first portions to be folded and extending in the folded direction and a flexible material part, to which the first and second portions are fixed.

Various embodiments of the present disclosure arrange the cover on the main body to be movable, thereby overcoming the difference in elongation which is generated as the main body is curved, bent or folded.

In addition, various embodiments of the present disclosure are capable of implementing the folded portion of the main body to be slimmed, and arranging the folding unit to be concealed within the main body. Thus, there is no constraint in terms of a design of an external appearance of a product.

In addition, according to various embodiments of the present disclosure, the folding unit for the flexible device allows a display to be folded with a simple structure.

Further, the present disclosure enables a shape of ribs of the folding member to be designed using equations so that the folded angle of the flexible device can be determined.

Moreover, various embodiments of the present disclosure vary the number or shape of the ribs so that the curved angle or folded angle of the main body and the display can be adjusted.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
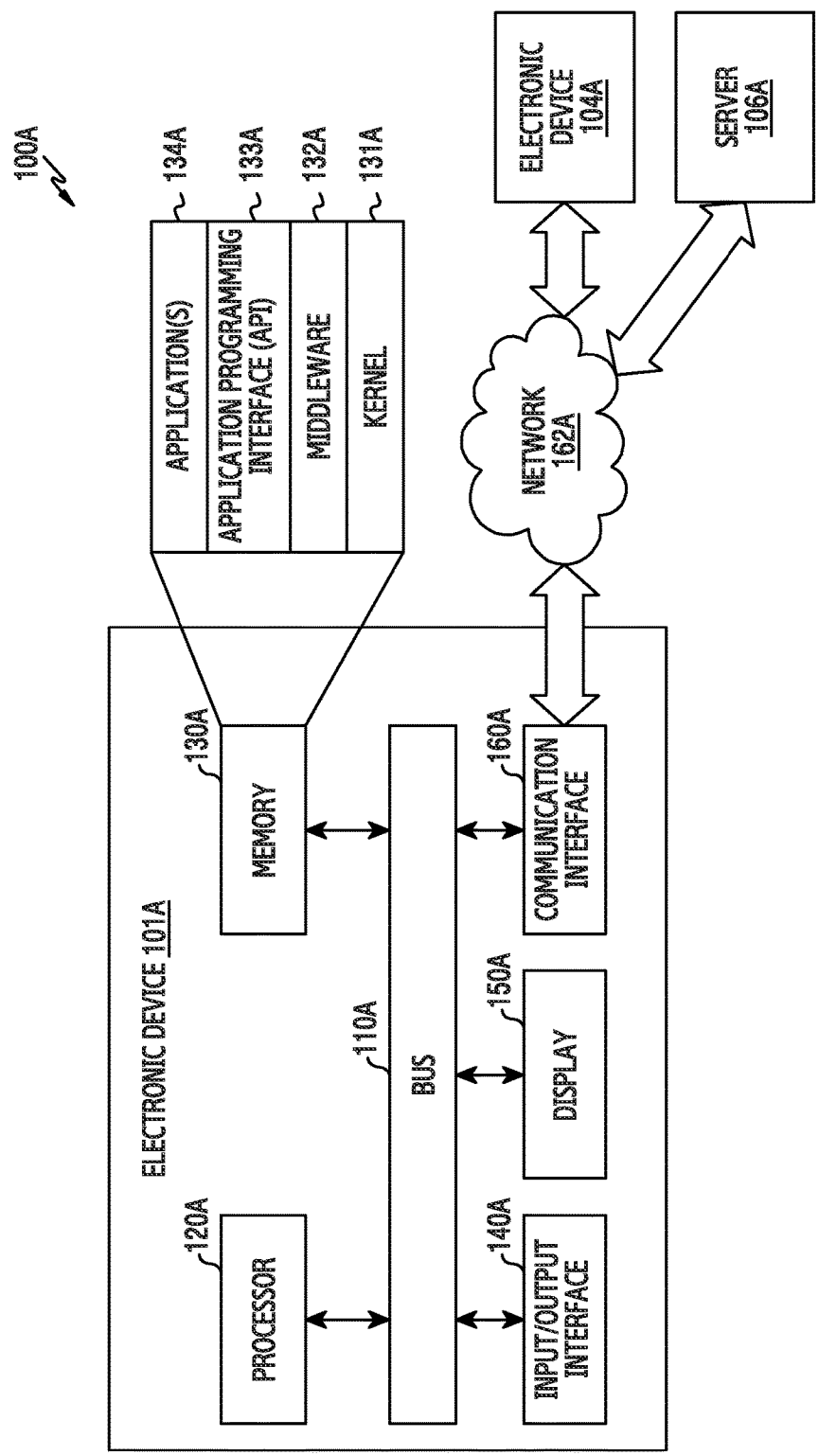
FIG. 1 illustrates a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In the present disclosure, the expressions "include" and/or "may include" refer to existence of a corresponding function, operation, and/or element, and do not limit one or more additional functions, operations, and/or elements. In the present disclosure, the terms such as "include" and/or "have" may be construed to denote a certain characteristic, number, operation, constituent element, element or a combination thereof, but may not be construed to exclude the existence of or a possibility of addition of one or more other characteristics, numbers, operations, constituent elements, elements or combinations thereof.

In the present disclosure, the expression "or" includes any or all combinations of words enumerated together. For example, the expression "A or B" may include A, may include B, or may include both A and B. For example, the expression "A or B" may include A, may include B, or may include both A and B.

Although the expressions such as "first" and "second" in the present disclosure can modify various constituent elements of the present disclosure, they do not limit the constituent elements. For example, the above expressions do not limit the sequence and/or importance of the elements. The above expressions are used merely for the purpose of distinguishing an element from the other elements. For example, a first user device and a second user device indicate different user devices although both of them are user devices. For example, a first element could be termed a second element, and similarly, a second element could be also termed a first element without departing from the scope of the present disclosure.

When an element is referred to as being "coupled" or "connected" to any other element, it should be understood that not only the element may be directly coupled or connected to the other element, but also a third element may be interposed therebetween. Contrarily, when an element is referred to as being "directly coupled" or "directly connected" to any other element, it should be understood that no element is interposed therebetween.

The terms used in the present disclosure are only used to describe specific embodiments, and are not intended to limit the present disclosure.

Unless defined otherwise, all terms used herein, including technical and scientific terms, have the same meaning as commonly understood by those of skill in the art to which the present disclosure pertains. Such terms as those defined in a generally used dictionary are to be interpreted to have the meaning equal to the contextual meaning in the relevant field of art, and are not to be interpreted to have ideal or excessively formal meaning unless clearly defined in the present disclosure.

An electronic device according to the present disclosure may be a device including a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MP3 player, a mobile medical device, a camera, a wearable device (for example, a Head-Mounted-Device (HMD) such as electronic glasses, electronic clothes, an electronic bracelet, an electronic necklace, an electronic appcessory, an electronic tattoo, and a smart watch).

According to various embodiments of the present disclosure, the electronic device may be a smart home appliance with a communication function. The smart home appliance as an example of the electronic device may include at least one of, for example, a television (TV), a Digital Versatile Disc (DVD) player, an audio player, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to various embodiments of the present disclosure, the electronic device may include at least one of various types of medical devices (for example, Magnetic Resonance Angiography (MRA), Magnetic Resonance Imaging (MRI), Computed Tomography (CT), a scanning machine, ultrasonic wave device and the like), a navigation device, a Global Positioning System (GPS) receiver, an Event Data Recorder (EDR), a Flight Data Recorder (FDR), a car infotainment device, ship electronic equipment (for example, navigation equipment for a ship, a gyro compass and the like), avionics, a security device, and an industrial or home robot.

According to various embodiments of the present disclosure, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to the present disclosure may be a combination of one or more of the aforementioned various devices. Further, it is obvious to those skilled in the art that the electronic device according to the present disclosure is not limited to the aforementioned devices.

Hereinafter, an electronic device according to various embodiments of the present disclosure will be described with reference to the accompanying drawings. In various embodiments of the present disclosure, the term "user" may indicate a person using an electronic device or a device (e.g., an artificial intelligence electronic device) using an electronic device.

Specifically, FIGS. 1 through 20, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element FIG. 1 illustrates a network environment including an electronic device according to an embodiment of the present disclosure.

Referring to FIG. 1, a network environment 100A including an electronic device 101A is illustrated, where the electronic device 101A may include a bus 110A, a processor 120A, a memory 130A, an input/output interface 140A, a display 150A, and a communication interface 160A.

The bus 110A may be a circuit that interconnects the above-described components with each other, and delivers communication signals (e.g., control messages) between the above-described components.

The processor 120A may decode a command received from any other components described above (e.g., the memory 130A, the input/output interface 140A, the display 150A, the communication interface 160A) through, for example, the bus 110A and execute an arithmetic operation or data processing according to the decoded command.

The memory 130A may store a command or data received from the processor 120A or any other components (e.g., the input/output interface 140A, the display 150A, and/or the communication interface 160A) or generated by the processor 120A or the other components. The memory 130A may include a programming module, such as, a kernel 131A, a middleware 132A, an Application Programming Interface (API) 133A or one or more applications 134A. Each of the programming modules described above may be configured by software, firmware, hardware, or a combination of at least two thereof.

The kernel 131A may control or manage system resources (e.g., the bus 110A, the processor 120A, and the memory 130A) used for executing operations or functions implemented in the other remaining programming modules, for example, the middleware 132A, the API 133A, and the applications 134A. In addition, the kernel 131A may provide an interface that allows the middleware 132A, the API 133A, or the applications 134A to access individual components of the electronic device 101A so as to control or manage the individual components of the electronic device 101A.

The middleware 132A may act as an intermediary to allow the API 133A or the applications 134A to communicate with the kernel 131A so as to exchange data. In addition, the middleware 132A may execute a control for a task request (e.g., scheduling or load balancing), for example, using a method of allocating a priority capable of using a system resource of the electronic device 101A (e.g., the bus 110A, the processor 120A, or the memory 130A) to, for example, at least one application among the applications 134A in connection with task requests received from the applications 134A.

The API 133A may include, for example, at least one interface or function (e.g., a command) for performing, for example, a file control, a window control, or a character control, as an interface that allows the applications 134A to control a function provided by the kernel 131A or the middleware 132A.

According to various embodiments of the present disclosure, the applications 134A may include a Short Message Service (SMS)/Multimedia Messaging Service (MMS) application, an e-mail application, a calendar application, an alarm application, a health care application (e.g., an application for measuring, for example, a quantity of motion or blood sugar), or an environment information application (e.g., an application for providing atmospheric pressure, humidity, or temperature information). Additionally or alternatively, the applications 134A may be applications related to information exchange between the electronic device 101A and an external electronic device (e.g., an electronic device 104A). The applications related to the information exchange may include, for example, a notification relay application for relaying specific information to the external electronic devices, and a device management application for managing the external electronic devices.

For example, the notification relay application may include a function of relaying notification information generated from the other applications of the electronic device 101A (e.g., the SMS/MMS application, the e-mail application, the health care application, or the environment information application) to an external electronic device (e.g., the electronic device 104A). Additionally or alternatively, the notification relay application may receive notification information from, for example, the external electronic device (e.g., the electronic device 104A) and provide the notification information to a user. The device management application may manage (e.g., install, delete, or update), for example, at least some functions (e.g., turning ON/OFF of the electronic devices themselves (or some components thereof) or adjustment of brightness of a display (or resolution)) of the external electronic devices (e.g., the electronic device 104A) that communicate with the electronic device 101A, or applications operated in the external devices or services (e.g., a call service or a message service).

According to various embodiments of the present disclosure, the applications 134A may include an application designated according to an attribute (e.g., the kind of electronic device) of the external electronic device (e.g., the electronic device 104A). For example, when the external electronic device is an MP3 player, the applications 134A may include an application related to music reproduction. Similarly, when the external electronic device is a mobile medical device, the applications 134A may include an application related to health care. According to an embodiment of the present disclosure, the application 134A may include at least one of an application designated to the electronic device 101A and an application received from an external electronic device (e.g., a server 106A, or the electronic device 104A).

The input/output interface 140A may relay a command or data input from a sensor (e.g., an acceleration sensor or a gyro sensor) or by the user through an input device (e.g., a keyboard or a touch screen) to, for example, the processor 120A, the memory 130A, or the communication interface 160A through the bus 110A. For example, the input/output interface 140A may provide data for the user's touch, which is input through the touch screen, to the processor 120A. In addition, the input/output interface 140A may output, for example, a command or data received from the processor 120A, the memory 130A, and/or the communication interface 160A, through the bus 110A through an output device (e.g., a speaker or a display). For example, the input/output interface 140A may output sound data processed through the processor 120A to the user through the speaker.

The display 150A may display various information items (e.g., multimedia data or text data) to the user.

The communication interface 160A may connect a communication between the electronic device 101A and the external device (e.g., the electronic device 104A, or the server 106A). For example, the communication interface 160A may support a communication on a network 162A (e.g., Internet, Local Area Network (LAN), Wire Area Network (WAN), telecommunication network, cellular network, satellite network, or plain old telephone service (POTS), a short-range communication (e.g., Wi-Fi, Bluetooth (BT), or Near Field Communication (NFC)), or a wired communication (e.g., Universal Serial Bus (USB), High Definition Multimedia Interface (HDMI), Recommended Standard-232 (RS-232), or POTS). According to an embodiment of the present disclosure, a protocol for communication between the electronic device 101A and the external device (e.g., short-range communication protocol, network communication protocol, network communication protocol, or wired communication protocol) may be supported by at least one of the API 133A and the middleware 132A. 104A may be the same (e.g., same type) device as the electronic device 101A or a different (e.g., different type) device.

Referring to FIGS. 2 to 6, a flexible device according to various embodiments of the present disclosure will be described.

Figure 2:
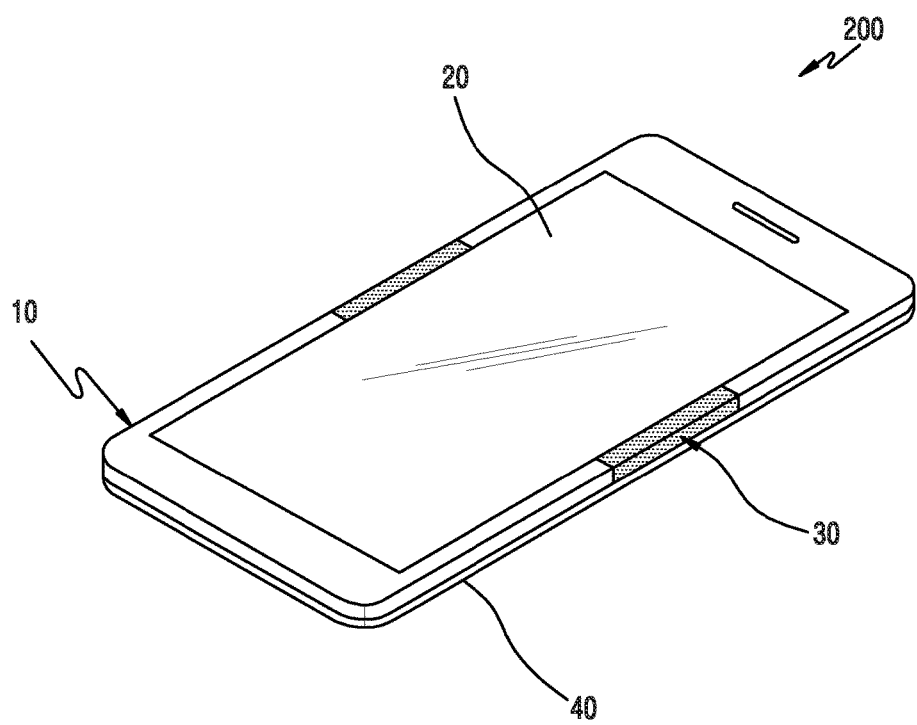
FIG. 2 is a perspective view illustrating a flexible device in which an unfolded state is exemplified according to an embodiment of the present disclosure.

FIG. 2 is a perspective view illustrating a flexible device in which an unfolded state is exemplified according to an embodiment of the present disclosure.

Figure 3:
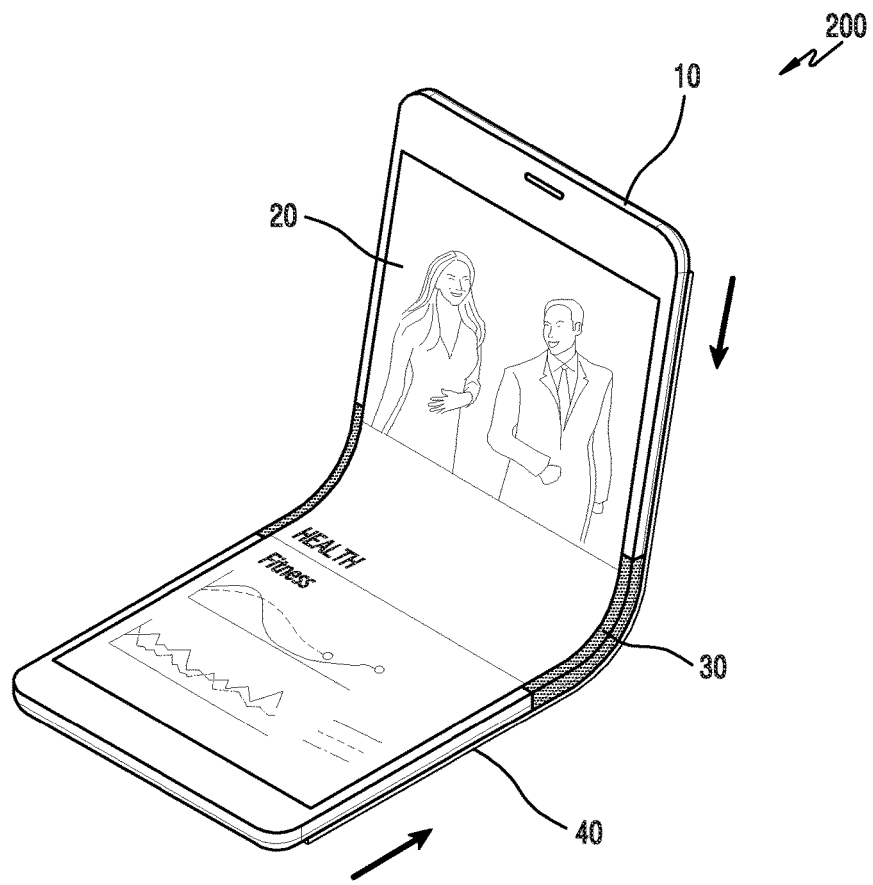
FIG. 3 is a perspective view illustrating a flexible device in which an approximately 90 degree-folded state is exemplified according to an embodiment of the present disclosure.

FIG. 3 is a perspective view illustrating a flexible device in which an approximately 90 degree-folded state is exemplified according to an embodiment of the present disclosure.

Figure 4:
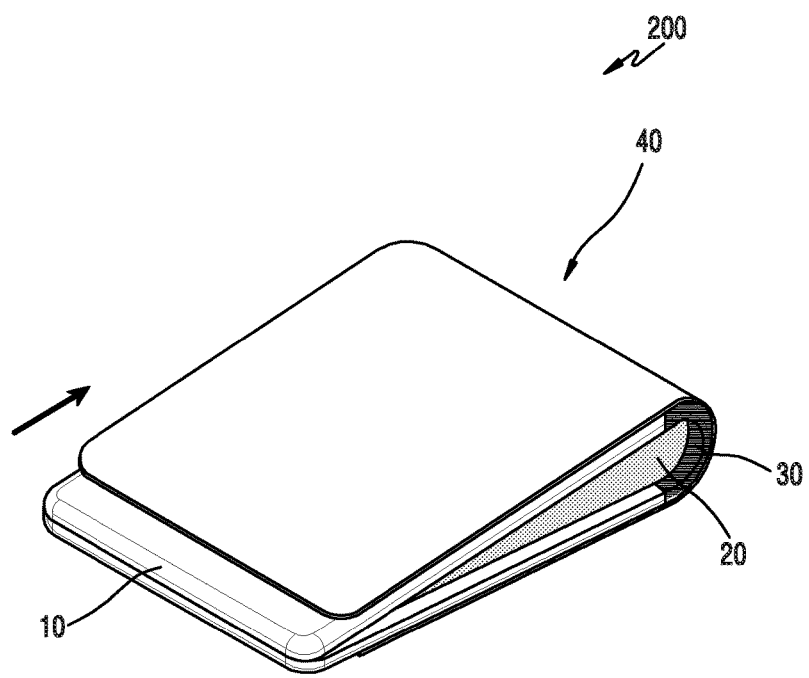
FIG. 4 is a perspective view of a flexible device in which an approximately 180 degree-folded state is exemplified according to an embodiment of the present disclosure.

FIG. 4 is a perspective view of a flexible device in which an approximately 180 degree-folded state is exemplified according to an embodiment of the present disclosure.

Referring to FIGS. 2 to 4, a flexible device 200 is illustrated, where the flexible device 200 refers to a device including a main body 10 which may be curved, bent or folded. Accordingly, the flexible device 200 may include a folding unit 30 and a folding axis center A (see FIG. 16, as discussed in more detail below). In addition, a display 20 provided on the main body 10 is a flexible display, and the display 20 may refer to a display which may be curved, bent, or folded together with the main body 10.

According to various embodiments of the present disclosure, in the flexible device 200, the display 20 is fixedly placed on the front face of the main body 10. The display 20 may be configured as a touch screen which enables data input/output. When the display 20 is the touch screen, a main home screen is displayed on the touch screen. The main home screen displayed on the display 20 refers to the first screen that is displayed on the display 20 (touch screen) when the power of the flexible device 200 is turned on. In addition, for example, shortcut icons for executing frequently used applications, a main menu shift key, time, and weather may be displayed on the home screen. Further, a status bar displaying a device status, such as a battery charging status, an intensity of received signal, or current time may be displayed. For example, a home button, a menu button, and a back button may be formed below the touch screen.

In addition, a first camera, an illuminance sensor and a proximity sensor (not illustrated) may be disposed in the front peripheral edge of the flexible device 200. On the rear face of the flexible device 200, a second camera, a flash, and a speaker may be disposed. In addition, a connector may be disposed on the lower end side face of the flexible device 200. A plurality of electrodes is formed in the connector to be connected with an external device in a wired manner. An earphone connection jack may be formed on the upper end side face of the flexible device 200. An earphone may be inserted into the earphone connection jack. The electronic components described above are not illustrated in the drawings for the convenience of description.

The flexible device 200 may include a cover 40, as well as the main body 10, and the display 20. The main body 10 may be configured as a foldable body by a folding unit 30. In addition, the main body 10 and a folded portion of the main body 10 may be made of different materials. The folded portion of the main body 10 may be made of a flexible material, and an unfolded portion of the main body may be made of a rigid material.

In addition, the display 20 may be made of a flexible material so that the display 20 may be placed in a flat state or a rolled state, or placed to be curved or folded. The display 20 is provided with a folding axis center where the display 20 is folded by the folding unit 30, in which the folding axis center may serve as a hinge axis.

The main body 10 may include a main board (not illustrated) and electronic components mounted on the main board. The main board (not illustrated) may be configured as an articulated (segmented) structure using a flexible circuit unit. The flexible circuit unit may be disposed in a folding unit 30. The folding unit 30 may be constituted in the folded portion of the main body 10. The display 20 may be fixedly disposed on one surface of the main body 10 and the cover 40 may be movably disposed on the other surface of the main body 10.

When the main body 10 is curved, bent or folded, a difference in elongation occurs in the folded portion. In other words, a compressing action is applied to the inside of the folded portion of the main body 10 while an extending action is applied to the outside of the folded portion. The display 20 provided on the main body 10 is a thin flexible display, and thus, is not substantially affected thereby. However, a substantial difference in elongation is practically caused in the main body 10 as compared to the display 20. The main body 10 is provided with the folding unit 30 so as to solve this problem, and the cover 40 is mounted to be slidable on the other surface of the main body 10, so that the problem caused due to the difference in elongation can be solved.

The cover 40 may be mounted to be slidable in the longitudinal direction of the main body 10 while maintaining a state in which the cover 40 faces the other surface of the main body 10. As the main body 10 is curved, bent, or folded, the cover 40 may be slid while maintaining the state in which it faces the main body 10. As described below, a sliding device may be mounted between the main body 10 and the cover 40.

As the main body 10 is curved, bent, or folded more largely, the sliding movement amount of the cover 40 also increases. In the unfolded state as illustrated in FIG. 2, the cover 40 may completely close/cover the other surface of the main body 10 without being moved, and in the completely folded state as illustrated in FIG. 4, the cover 40 is slid most largely so that a portion of the main body 10 may be most largely opened. The cover 40 may also be provided with a folded portion in an area where it faces the folding unit 30. For this purpose, the cover 40 may be made of a flexible material such as leather that provides a luxurious feeling. In addition, the cover 40 may serve an exterior cover function of protecting the main body 10, and when the cover 40 is made using various flexible materials or colors, the cover 40 may be configured to reflect the user's personality and to be replaceable from the main body 10.

The folded portion of the main body 10 may be changed depending on the disposed position of the folding unit 30, and the curved, bent or folded degree may be changed depending on the configuration of the folding unit 30. The folding unit 30 will be described in detail below.

Figure 5:
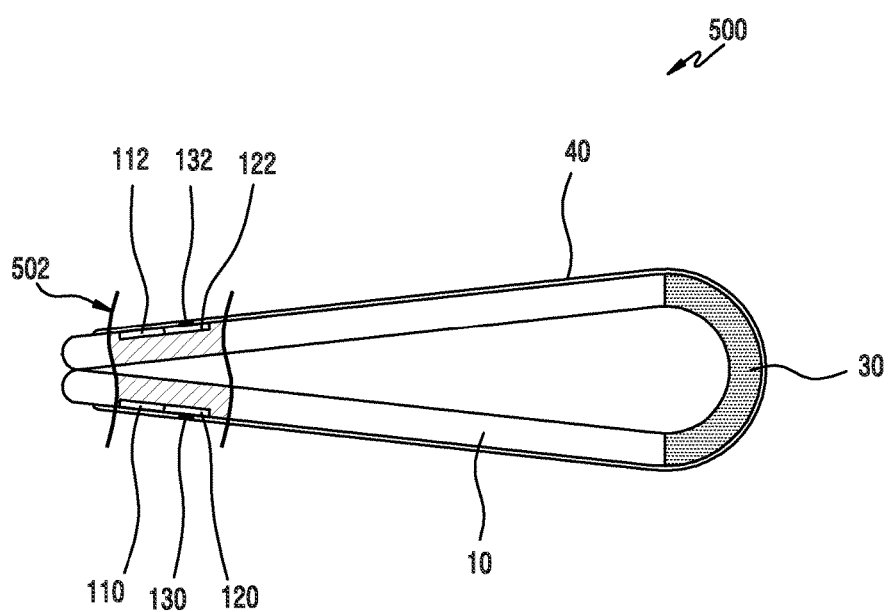
FIG. 5 is a side view illustrating a flexible device partially in cross-section, in which an approximately 180 degree-folded state is exemplified according to an embodiment of the present disclosure.

FIG. 5 is a side view illustrating a flexible device partially in cross-section, in which an approximately 180 degree-folded state is exemplified according to an embodiment of the present disclosure.

Figure 6:
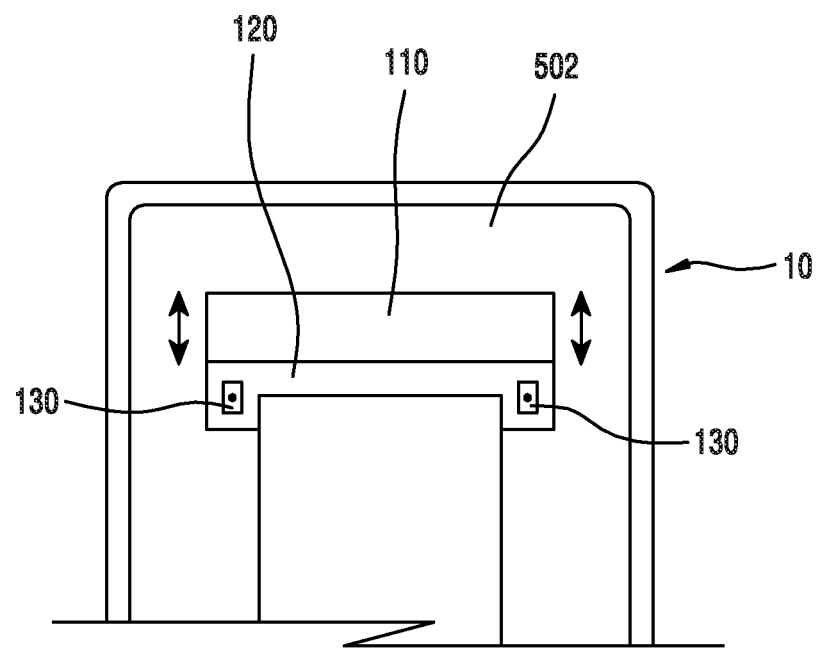
FIG. 6 is a front view illustrating a sliding member mounted on a main body of a flexible device according to an embodiment of the present disclosure.

FIG. 6 is a front view illustrating a sliding member mounted on a main body of a flexible device according to an embodiment of the present disclosure.

Referring to FIGS. 5 and 6, a flexible device 500 is illustrated, where the flexible device 500 may include a sliding device 502 between a main body 10 and a cover 40. The sliding device 502 may allow a difference in elongation caused in the main body 10 as the main body 10 is folded.

The sliding device 502 may include recesses 110 and 112 formed on the other surface of the main body 10, sliding members 120 and 122 safely accommodated in the recesses 110 and 112 to be slid depending on whether the or not the main body 10 is folded, and fastening portions 130 and 132 that connect the main body 10 with the sliding member 120 and 122, respectively. The recesses 110 and 112 are recessed by a predetermined depth from the other surface of the main body 10 and may be configured in a groove shape, in which the sliding members 120 and 122 are moveable therein, respectively.

The sliding members 120 and 122 are formed in a thin-plate shape and may be reciprocally slid within the recesses 110 and 112 in a state where the sliding members are accommodated in the recesses 110 and 112, respectively. Each of the sliding members 120 and 122 may be formed as a thin plate by a rigid plastic material. Each of the fastening portions 130 and 132 may connect the sliding members 120 and 122 with the cover 40 using fasteners. As the sliding members 120 and 122 move, the cover 40 may be slid on the other surface of the main body 10. In addition, the sliding members 120 and 122 may be mounted symmetrically to face the top and bottom surfaces of the main body 10. Although the sliding members 120 and 122 may be symmetrically mounted to be opposed to each other with reference to the folding unit 30, one of the sliding devices 120 and 122 may be mounted. When one of the sliding devices 120 and 122 is mounted, the cover 40 may be moved at the side where the sliding device is moved.

Figure 7:
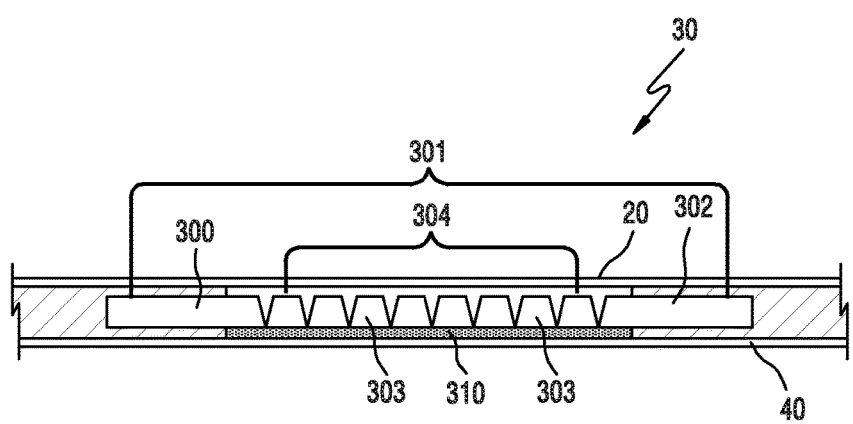
FIG. 7 is a cross-sectional view illustrating a folding unit employed in a flexible device in which the folding unit is exemplified in an unfolded state according to an embodiment of the present disclosure.

FIG. 7 is a cross-sectional view illustrating a folding unit employed in a flexible device in which the folding unit is exemplified in an unfolded state according to an embodiment of the present disclosure.

Figure 8:
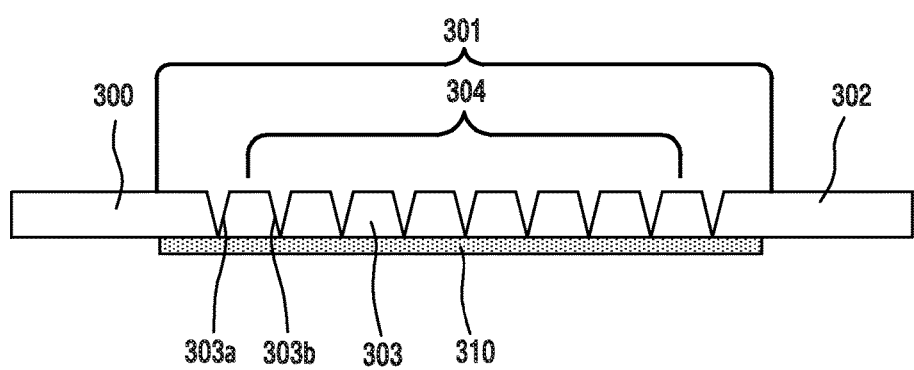
FIG. 8 is a cross-sectional view illustrating a folding unit in which the folding unit is exemplified in an unfolded state according to an embodiment of the present disclosure.

FIG. 8 is a cross-sectional view illustrating a folding unit in which the folding unit is exemplified in an unfolded state according to an embodiment of the present disclosure.

Referring to FIGS. 7 and 8, a folding unit 30 is illustrated, where the folding unit 30, according to various embodiments of the present disclosure, is a connection device mounted on the main body 10, as illustrated in FIG. 2, and may include a folding member 301 and a flexible material part 310. The folding member 301 may be disposed in the inside of the main body 10 to be concealed so that the folding member 301 is not visible from the outside of the main body 10. In addition, the folding member 301 is covered by a cover 40 made of a flexible material and disposed to be shielded from the outside, i.e. to be concealed. The flexible material part 310 may be disposed to face the folded portion of the cover 40. The flexible material part 310 may be stretched as the main body 10 is curved, bent, or folded. That is, the flexible material part 310 may be curved, bent, or folded regardless of a difference in elongation which is caused as the main body 10 is curved, bent, or folded.

According to various embodiments of the present disclosure, the folding unit 30 may be configured to perform a movement similar to that of a spring in a state where the folding member of the folding unit is disposed to be concealed therein in consideration of the outer appearance thereof simultaneously when the main body is curved, bent, or folded.

A display 20 is provided on a flexible device (e.g., the flexible device 500, as illustrated in FIG. 5) is a flexible display, and may be provided in a curved type, a bending type, or a folding type display. The folding type display 20 may be constituted with an Organic Light Emitting Diode (OLED), for example.

According to various embodiments of the present disclosure, the folding unit 30 may include the folding member 301 in the folded portion of the main body 10. The folding member 301 is provided in the portion, in which the main body 10 and the display 20 are folded, to be movable within the folded portion of the main body 10. In other words, the folding member 301 is mounted within the main body 10 to be concealed from the outside. This is to make the outer appearance of the flexible device beautiful. In other words, in a state where the flexible device 500 is completely unfolded to be flat, the folding member 301 is moved not to protrude from the folded portion of the main body 10, and the folding member 301 may be configured have a thickness equal to or smaller than that of the main body 10, in which the folding member 301 is not disposed, so as to make an outer appearance of the flexible device 500 simple and beautiful.

The main body 10 is covered by the flexible material part 310 in an area where the folding member 301 is mounted so that the folding member 301 is shielded from the external environment. The flexible material part 310 may be made of a material such as rubber or silicon. The folding member 301 extends along a folding axis center, and the cover 40 extends along the folding axis therewith.

The folding member is accommodated in a mounting space existing within the main body 10 and may be mounted to be movable in the state where the folding member is disposed in the mounting space. That is, the folding member may be slid along a direction where the mounting space is formed while the main body 10 is curved, bent, or folded.

Referring to FIGS. 7 and 8, the folding member 301 is a member made of a rigid material such as a metal, and may be fixedly disposed to be integral with the flexible material part 310. The folding member 301 may be configured to be slid along a main body mounting space. The folding member 301 has a substantially flat shape, and is accommodated in the mounting space to be moved while the main body 10 and the display 20 are curved, bent, or folded.

The folding member 301 may include first portions 300 and 302 that provide a sliding guide function, and a second portion 304 that is folded. The first portions 300 and 302 may be formed by opposite end portions of the folding member, and the second portion 304 may be formed by the portion between the first portions 300 and 302. In addition, the folding member extends along the folding axis center and the first portions 300 and 302 may be reciprocally slid in a direction perpendicular to the folding axis.

The first portions 300 and 302 serve to guide the folding member 301 and to maintain the folding angle of the folding member 301 (together with a holding unit), and the second portion 304 serves the folding function. All of the first portions 300 and 302 and the second portion 304 are rigid but may be integrally formed with the flexible material part 310 through dual injection molding.

The second portion 304 is a folded portion and includes a plurality of ribs 303. Each of the ribs 303 may be formed in any one shape among a rack gear-tooth shape, a saw-tooth shape, and an isosceles trapezoid shape in cross-section, and the ribs 303 may be provided at regular intervals. All the ribs may be formed in the same shape, or may be different shapes, respectively.

However, considering the bent or folded degree of the flexible device 500, a number of the ribs 303 that are provided may change and the cross-sectional shapes of the ribs 303 may change.

In a state where the flexible device is disposed to be flat, equal sides 303a and 303b of respective ribs 303 remain spaced apart from each other. Meanwhile, in a state where the flexible device is completely folded, the equal sides 303a and 303b of respective ribs 303 are kept in a state where they closely face each other, come in close contact with each other, or relatively very closely face each other. In other words, the respective ribs 303 may be further spaced apart from each other as the flexible device is in a more unfolded state, and the respective ribs 303 are disposed more closely to each other as the flexible device is folded more and more and finally disposed to be in close contact with each other.

The close contact state refers a state in which the flexible device cannot be further curved nor folded.

Figure 9:
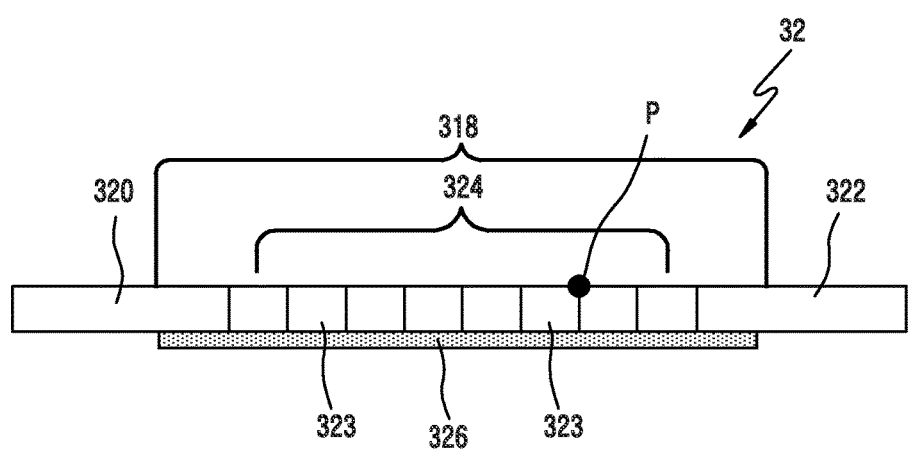
FIG. 9 is a cross-sectional view illustrating a folding unit in which the folding unit is exemplified in an unfolded state according to an embodiment of the present disclosure.

FIG. 9 is a cross-sectional view illustrating a folding unit in which the folding unit is exemplified in an unfolded state according to an embodiment of the present disclosure.

Referring to FIG. 9, a folding unit 32 is illustrated, where the folding unit 32 includes a flexible material part 326, and a folding member 318 fixed to the flexible material part 326, where the folding member 318 includes first portions 320 and 322 and a second portion 324. The folding member 318 illustrated in FIG. 9 is the same as the folding member 301 illustrated in FIG. 8, except for the shape of the ribs 323. Thus, further descriptions will be omitted. The folding member may include ribs 323 having a rectangular or square shape in cross-section. The ribs illustrated in FIG. 8 may cause the inner surface of the main body to be damaged since the top ends of the respective ribs come in contact with or collide with each other while the ribs move, which may be improved by the ribs illustrated in FIG. 9.

According to various embodiments of the present disclosure, the ribs 323 are disposed on the flexible material part 326 to be in close contact with each other. Of course, the ribs 323 may be disposed to be spaced apart from each other at regular intervals. However, in order to prevent interference with the display positioned on the ribs, the respective ribs 323 may be formed in a rectangular or square shape and may be disposed to be in close contact with each other. Reference symbol P designates a rotation point. The corner points of opposite ends of a top surface of each of the ribs 323 may become rotation points.

Descriptions will be made on an angle holding structure of a flexible device according to various embodiments of the present disclosure with reference to FIGS. 10 to 13.

Figure 10:
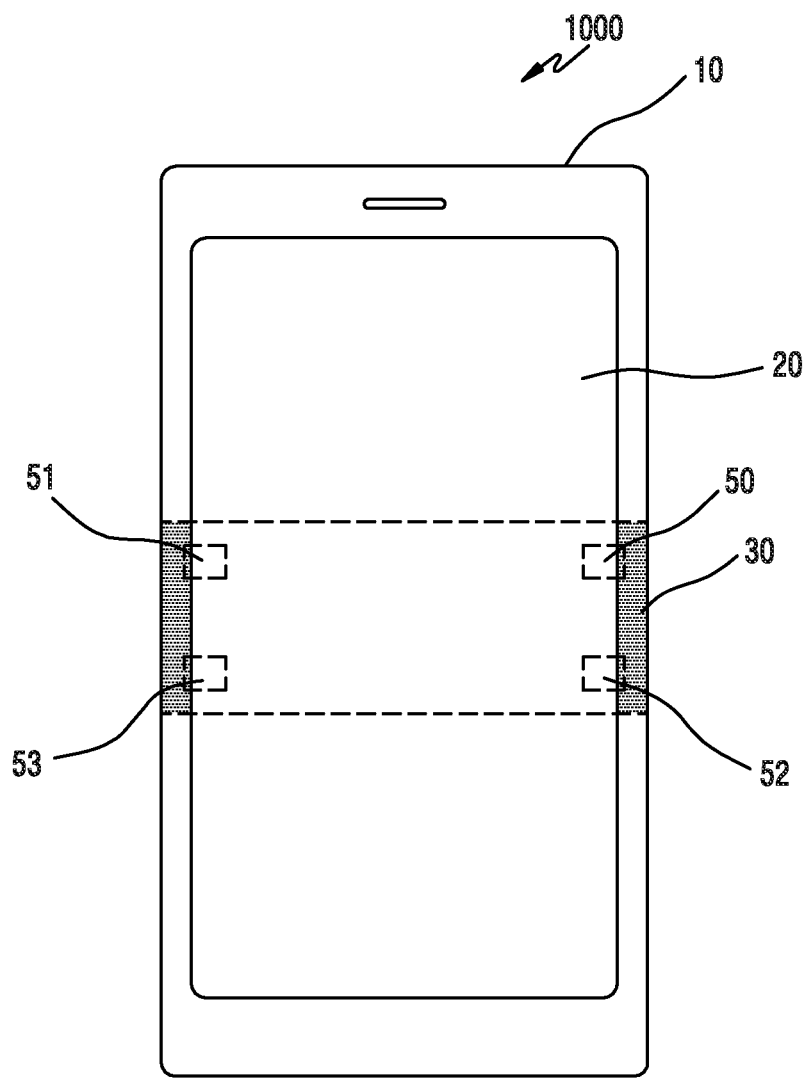
FIG. 10 is a view exemplifying an arrangement state of a holding unit employed in a flexible device according to an embodiment of the present disclosure.

FIG. 10 is a view exemplifying an arrangement state of a holding unit employed in a flexible device according to an embodiment of the present disclosure.

Figure 11:
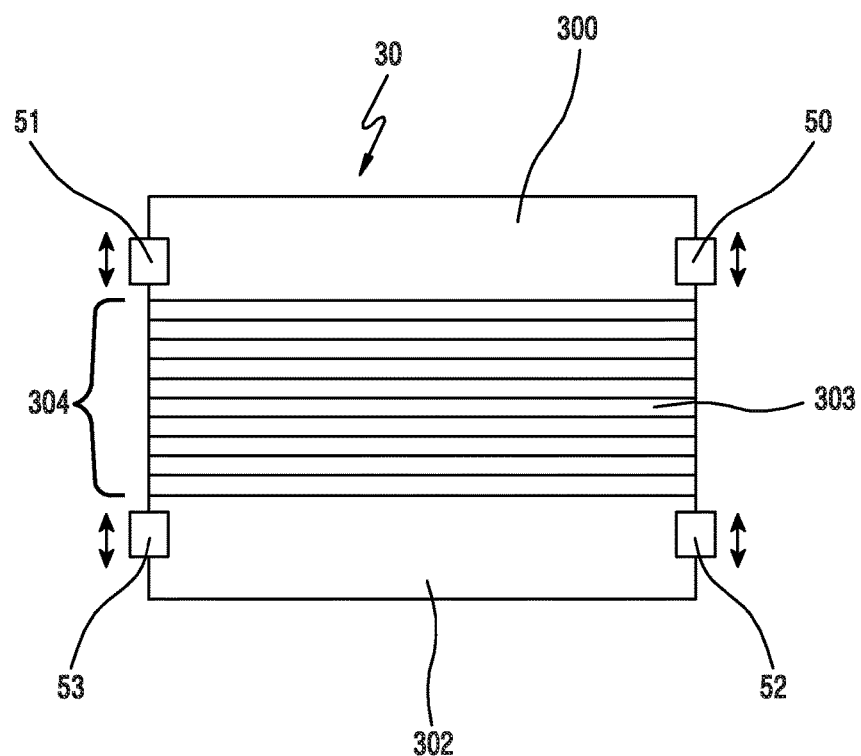
FIG. 11 is a view exemplifying an arrangement state of a holding unit employed in a flexible device according to an embodiment of the present disclosure.

FIG. 11 is a view exemplifying an arrangement state of a holding unit employed in a flexible device according to an embodiment of the present disclosure.

Referring to FIGS. 10 and 11, a flexible device 1000 is illustrated, where the flexible device 1000 may include a main body, a display 20 and a folding unit 30 that is capable of holding a curved or folded state in cooperation with holding members 50, 51, 52 and 53. The holding members 50 to 53 may be together identified as a holding unit and may hold the curved or folded state of the main body 10 by the friction with the folding member 301, as illustrated in FIG. 7.

The holding members 50 to 53 may be disposed to be in cooperation with first portions 300 and 302 of the folding unit 30, i.e., the opposite end portions of the folding unit 30, respectively, as well as second portion 304 including a plurality of ribs 303. The holding members 50 to 53 may be disposed on the opposite end portions 300 and 302 of the folding member to be symmetric in all directions about the folding axis center. The holding members 50 to 53 are disposed to wrap a part of the folding unit 30 so as to provide a force for holding the curved or bent state of the main body 10 by the frictional force therebetween.

Descriptions will be made on a configuration and operation of a holding unit according to various embodiments of the present disclosure with reference to FIGS. 12 and 13.

Figure 12:
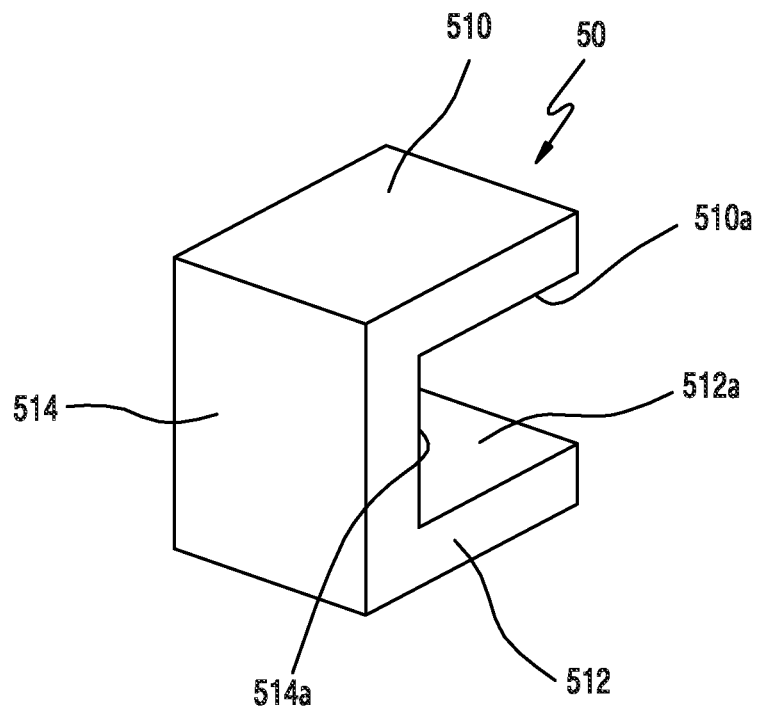
FIG. 12 is a perspective view illustrating one holding member according to an embodiment of the present disclosure.

FIG. 12 is a perspective view illustrating one holding member according to an embodiment of the present disclosure.

Figure 13:
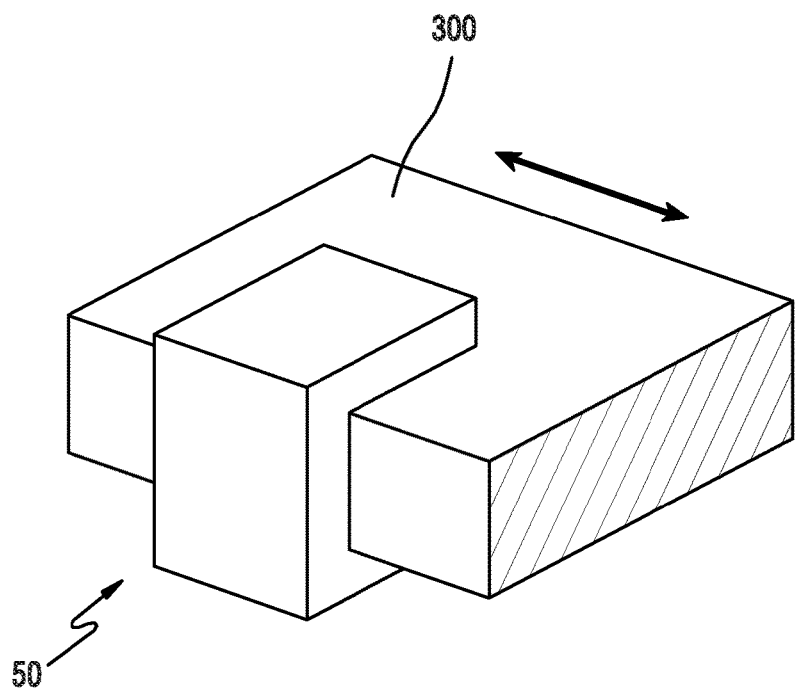
FIG. 13 is a perspective view illustrating a state in which a holding member and a folding unit cooperate with each other according to an embodiment of the present disclosure.

FIG. 13 is a perspective view illustrating a state in which a holding member and a folding unit cooperate with each other according to an embodiment of the present disclosure.

Referring to FIGS. 12 and 13, a holding member 50 is illustrated, where the holding member 50 may be any of first to fourth holding members 50 to 53, as illustrated in FIG. 10. Since the four holding members 50 to 53 are configured to have the same shape, descriptions will be made only with reference to the first holding member 50.

The first holding member 50 may include an upper portion 510, a lower portion 512, and a connection portion 514 that connects the upper and lower portions 510 and 512. The upper portion 510, the lower portion 512, and the connection portion 514 may be integrally injection-molded. The first holding member 50 is disposed to wrap a part of the opposite end portions of the folding member, and a frictional force generated by the cooperation between the first holding member and the opposite end portions serves as the force for holding the folded state of the main body. In addition, the sliding movement of the opposite end portions is guided by the shape of the first holding member 50. That is, the four holding members may also serve as a guide. The first holding member 50 may be coupled to a part of the opposite end portions 300 and 302, as illustrated in FIGS. 11 and 13, in a closely contacted state. That is, inner surfaces 510a, 512a, and 514a of the first holding member 50 are contact surfaces that may generate the frictional force.

In addition, as illustrated in FIGS. 10 and 11, the main body 10 may be held in the curved or folded state due to the frictional force generated by the cooperative structure between the first and second holding members 50 and 51 and one end portion 300 and the cooperative structure between the third and fourth holding members 52 and 53 and the other end portion 302.

Figure 14:
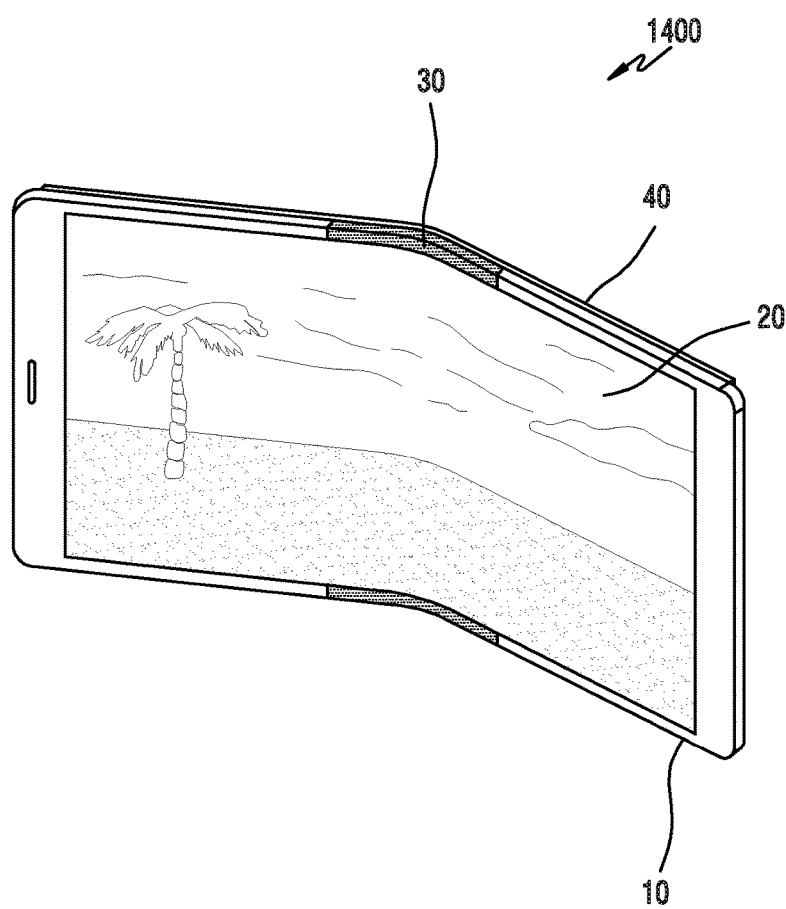
FIG. 14 is a perspective view illustrating a curved flexible device according to an embodiment of the present disclosure.

FIG. 14 is a perspective view illustrating a curved flexible device according to an embodiment of the present disclosure.

Figure 15:
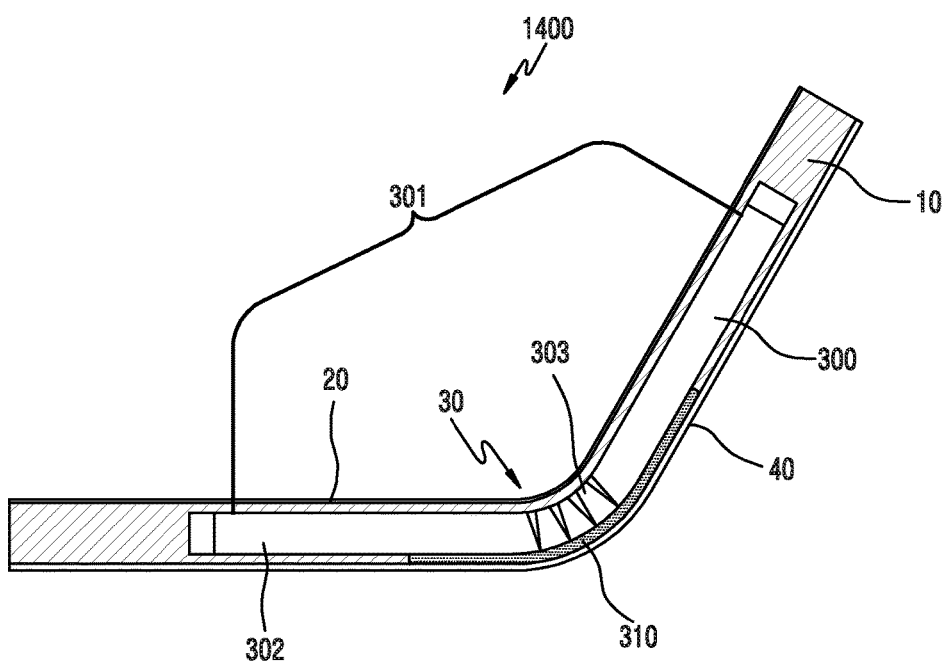
FIG. 15 is a cross-sectional view illustrating a folding unit employed in a curved flexible device according to an embodiment of the present disclosure.

FIG. 15 is a perspective view illustrating a folding unit employed in a curved flexible device according to an embodiment of the present disclosure.

Referring to FIGS. 14 and 15, a flexible device 1400 is illustrated, where the flexible device 1400 may be placed in a curved shape and may include a main body 10, a display 20, a folding unit 30 and a cover 40.

Accordingly, the flexible display 20 may be fixed to one surface of the main body 10 in the curved shape. The display 20 placed in the curved shape may improve the immersion level of a displayed screen in a viewer's viewpoint. For the placement in the curved shape, the main body may be provided with the folding unit 30. Since the configurations of the folding unit 30 and the cover 40 have already been described, further detailed descriptions thereof will be omitted. However, the operation of the folding unit 30 will be described below with reference to FIG. 15.

Referring to FIGS. 7 and 15, in the folding unit 30, when the main body 10 of the flexible device 1400 is curved, each of opposite end portions 300 and 302 of a folding member 301 is slid, and when a flexible material part 310 is folded, the equal sides of respective ribs 303 may be disposed to be closer to each other. Similarly to the folding member, the cover 40 may be slid on the other surface of the folding member. The maximum curved angle of the flexible device may vary depending on the shape or number of the respective ribs 303.

Figure 16:
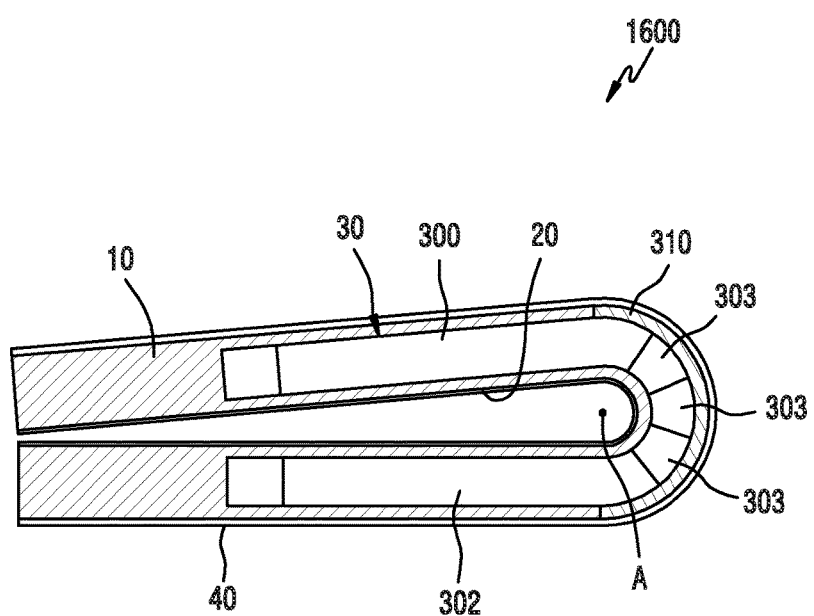
FIG. 16 is a cross-sectional view illustrating a folding unit employed in a curved flexible device in which a 180 degree-folded state is exemplified according to an embodiment of the present disclosure.

FIG. 16 is a cross-sectional view illustrating a folding unit employed in a curved flexible device in which a 180 degree-folded state is exemplified according to an embodiment of the present disclosure.

Referring to FIG. 16, a flexible device 1600 is illustrated, where the flexible device 1600 may include a main body 10, a display 20 a folding unit 30 and a cover 40, such that in the folding unit 30, when the main body 10 is completely folded, each of opposite end portions 300 and 302 of the folding member 301, as illustrated in FIG. 7, is moved to a maximum, a flexible material part 310 is stretched to the maximum, and equal sides of respective ribs 303 are in the close contact state. As illustrated, the folding unit 30 is folded at a folding axis center A. Similarly to the folding member 301, the cover 40 may be slid to the maximum on the other surface of the main body. When the equal sides of the respective ribs 303 come in close contact with each other, the main body 10 cannot be curved or folded any more.

Figure 17:
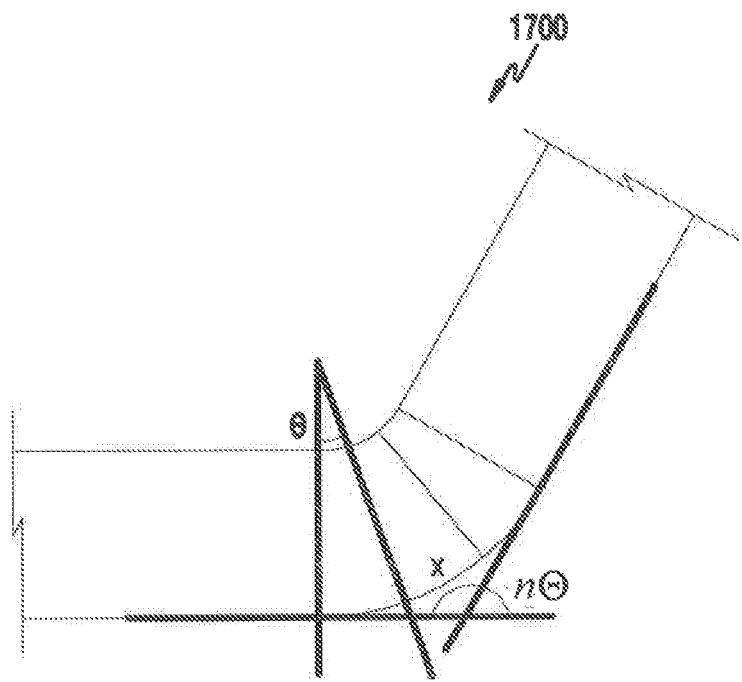
FIG. 17 is a view geometrically illustrating a folded angle of a flexible device related to an equation according to an embodiment of the present disclosure.

FIG. 17 is a view geometrically illustrating a folded angle of a flexible device related to an equation according to an embodiment of the present disclosure.

Figure 18:
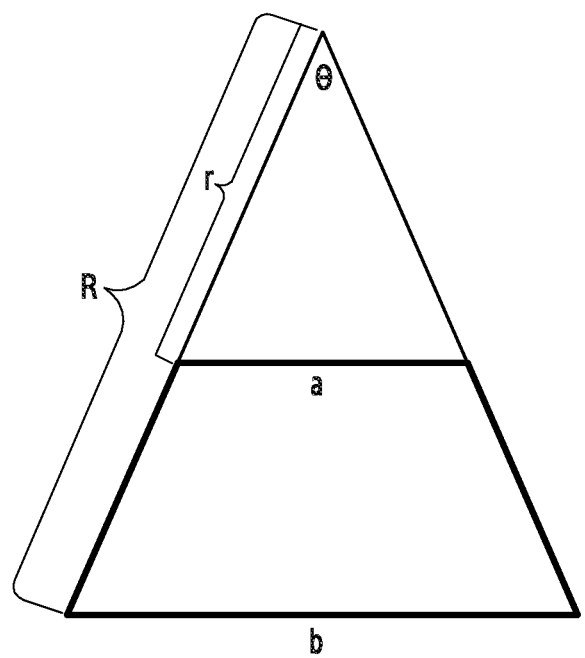
FIG. 18 is a view geometrically illustrating a rib designed using equations according to an embodiment of the present disclosure.

FIG. 18 is a view geometrically illustrating a rib designed using equations according to an embodiment of the present disclosure.

Referring to FIGS. 17 and 18, a maximum curved angle of a flexible device 1700 is illustrated, where a shape of the respective ribs 303, as illustrated in FIG. 7, that form the second portion 304, as illustrated in FIG. 7, may be designed using the following equations.

Assuming that the number of ribs to be formed is "n," the thickness of a flexible material is "r," the thickness of a rigid material is "R," and the maximum curved angle of the flexible device is "x," an angle included between the equal sides "Θ" and lengths of top and bottom sides "a" and "b" of each of the ribs may be determined using the following equations.

$$\Theta=(180°-x)/n \quad \text{Equation 1}$$

$$a=2\Pi r\Theta/360n \quad \text{Equation 2}$$

$$b=2\Pi R\Theta/360n \quad \text{Equation 3}$$

The shape of the ribs may be designed using the equations described above. Based on the equations described above, the isosceles trapezoidal shape of the ribs may be determined depending on the maximum curved angle of the flexible device and the thicknesses of materials.

Figure 19:
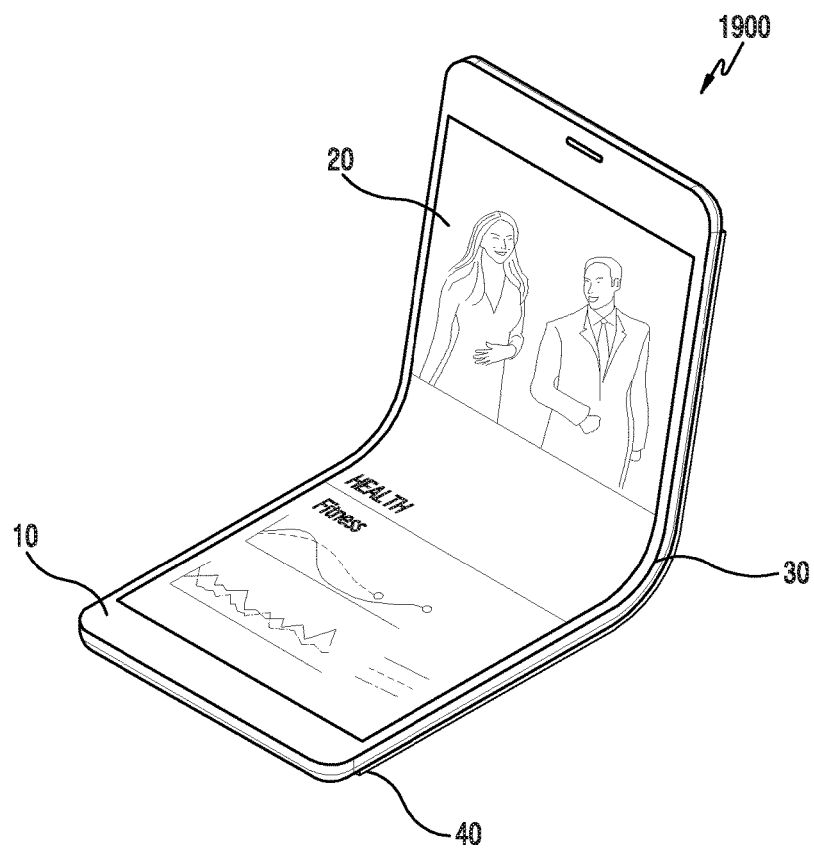
FIG. 19 is a perspective view illustrating a flexible device, in a state where the flexible device is folded at a 5:5 point, according to an embodiment of the present disclosure.

FIG. 19 is a perspective view illustrating a flexible device, in a state where the flexible device is folded at a 5:5 point, according to an embodiment of the present disclosure.

Referring to FIG. 19, a flexible device 1900 is illustrated, where the flexible device 1900 includes a main body 10, a display 20, a folding unit 30 and a cover 40. The folding unit 30 is disposed at a middle point of the flexible device 1900, and as a result, the main body 10 may be used in the state where it is folded approximately in half.

Figure 20:
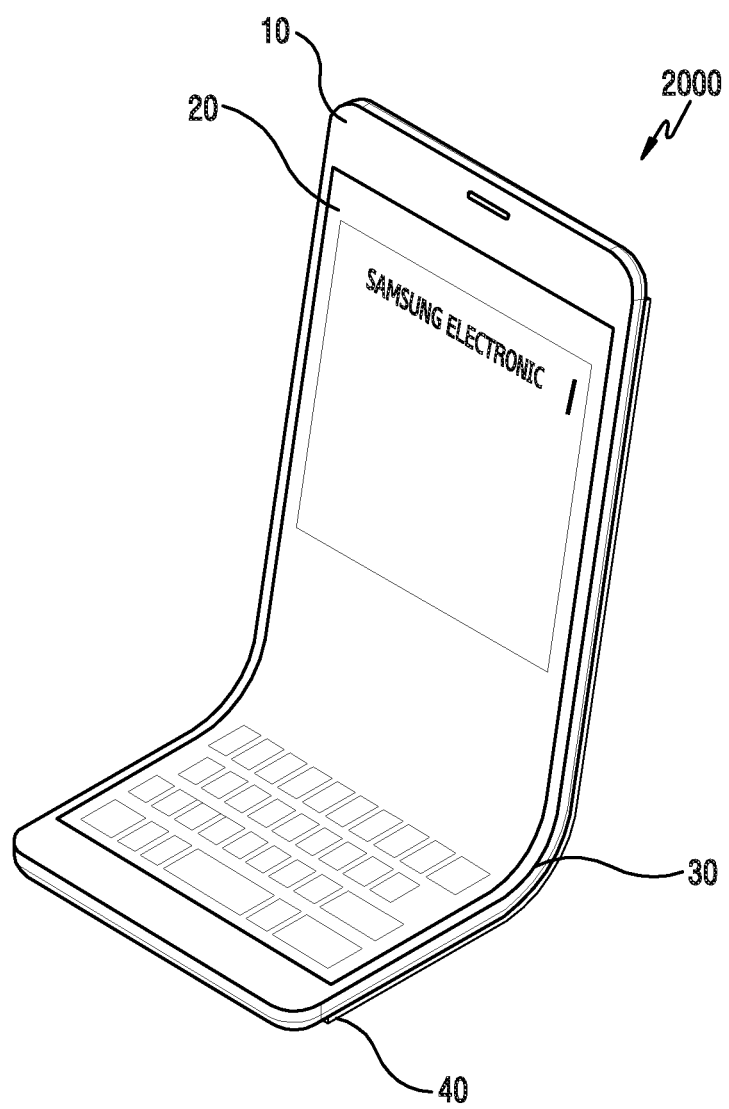
FIG. 20 is a perspective view illustrating a flexible device, in a state where the flexible device is folded at a 3:7 point, according to an embodiment of the present disclosure.

FIG. 20 is a perspective view illustrating a flexible device, in a state where the flexible device is folded at a 3:7 point, according to an embodiment of the present disclosure.

Referring to FIG. 20, a flexible device 2000 is illustrated, where the flexible device 2000 includes a main body 10, a display 20, a folding unit 30 and a cover 40. The folding unit 30 is disposed at a lower point of the flexible device 2000, and the main body 10 may be used in the state where it is folded approximately at the ⅓ point.

In addition, according to various embodiments of the present disclosure, the flexible device may be provided with two or three folding units rather than one folding unit so that the display may be configured to be variously bent or folded as needed.

Further, according to various embodiments of the present disclosure, the folded degree of the folding member of the flexible device may be adjusted according to the number or shape of ribs.

The aforementioned elements of the electronic device according to various embodiments of the present disclosure may be constituted by one or more components, and the name of the corresponding element may vary with a type of electronic device. The electronic device according to various embodiments of the present disclosure may include at least one of the aforementioned elements. Some elements may be omitted or other additional elements may be further included in the electronic device. Further, some of the components of the electronic device according to the various embodiments of the present disclosure may be combined to form a single entity, and thus, may equivalently execute functions of the corresponding elements prior to the combination.

According to various embodiments of the present disclosure, at least some of the devices (for example, modules or functions thereof) or the method (for example, operations) according to the present disclosure may be implemented by a command stored in a computer-readable storage medium in a programming module form. When the command is executed by one or more processors, the one or more processors may perform a function corresponding to the command. The computer-readable storage medium may be, for example, the memory 130A, as illustrated in FIG. 1. At least some of the programming modules may be implemented (for example, executed) by, for example, the processor. At least some of the programming modules may include, for example, a module, a program, a routine, and a set of instructions or a process for performing one or more functions.

The computer readable recording medium may include magnetic media such as a hard disc, a floppy disc, and a magnetic tape, optical media such as a compact disc read only memory (CD-ROM) and a DVD, magneto-optical media such as a floptical disk, and hardware devices specifically configured to store and execute program commands, such as a ROM, a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The module or programming module according to an embodiment of the present disclosure may include one or more of the above-described elements. Alternatively, some of the above-described elements may be omitted from the programming module. Alternatively, the programming module may further include additional elements. Operations executed by a module, a programming module, or other component elements according to the present disclosure may be executed sequentially, in parallel, repeatedly, or in a heuristic manner. Further, some operations may be executed in a different order, some of the operations may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A flexible device comprising:
a main body;
a flexible display fixed to a first surface of the main body;
a folding unit disposed on the main body; and
a holding unit, configured to:
   attach to, and detach from, the main body, and
   cooperate with the folding unit to hold the main body in a curved or folded position,
wherein a second surface of the main body is opposite to the first surface of the main body, such that, when the main body is curved or folded, a cover moves with respect to the second surface of the main body to compensate for a difference in elongation, which is generated when the main body is curved or folded,
wherein the cover is slidable along a longitudinal direction of the main body while maintaining the cover facing the second surface of the main body,
wherein the cover is configured to, when the main body is unfolded, completely cover the second surface of the main body,
wherein the cover is further configured to, when the main body is curved or folded, slide along the longitudinal direction so as to uncover one end of the second surface along the longitudinal direction of the main body and an opposite end of the second surface along the longitudinal direction of the main body,
wherein the holding unit is disposed and further configured to wrap at least a part of the folding unit,
wherein the holding unit is further configured to generate a frictional force that holds the main body in a curved or folded position through friction with the folding unit,
wherein the folding unit includes at least a part of a folding member that slides within the main body,
wherein the folding unit further includes:
a flexible material part exposed to an outside of the flexible device; and
a plurality of ribs arranged at regular intervals on the flexible material part and integrally fixed to the flexible material part to be folded,
wherein the folding member includes opposite ends, which move when the main body is curved or folded, and
wherein the folding member is disposed to be concealed within the main body.

2. The flexible device of claim 1, wherein the holding unit includes a holding member disposed and further configured to be in contact with the opposite ends of the folding member so as to generate a force for holding the main body in a curved or folded position by friction with the opposite ends.

3. The flexible device of claim 2, wherein each of the opposite ends is configured to act as a guide.

4. The flexible device of claim 2,
wherein the holding member is formed as a fallen U shape in cross-section including an upper portion, a lower portion, and a connection portion that connects the upper and lower portions, and
wherein each of inner surfaces of the upper and lower portions and the connection portions is in contact with the opposite ends so as to generate a frictional force.

5. The flexible device of claim 1, wherein each of the ribs is formed in one of a saw-tooth shape, or an isosceles trapezoidal shape in cross-section.

6. The flexible device of claim 1,
wherein each of the ribs is formed in one of a rectangular shape, or a square shape in cross-section, and wherein the ribs are further arranged to be in contact with each other.

7. The flexible device of claim 1, wherein a number of the ribs to be formed is "n", a thickness of a flexible material is "r", a thickness of a rigid material is "R", a maximum curved angle of the flexible device is "x", and an angle included between equal sides "Θ" and lengths of top and bottom sides "a" and "b" of each of the ribs are designed using the following equations:

$$\Theta = (180° - x)/n;$$

$$a = 2\Pi r \Theta/360n; \text{ and}$$

$$b = 2\Pi R \Theta/360n.$$

8. The flexible device of claim 1, wherein a portion of the main body, on which the folding unit is disposed, is formed to have a thickness which is the same as a thickness of another portion of the main body, on which the folding unit is not disposed.

* * * * *